United States Patent
Bachman et al.

[11] Patent Number: 5,532,671
[45] Date of Patent: Jul. 2, 1996

[54] METHOD AND APPARATUS FOR INFORMING A DRIVER OF THE PROPULSIVE CAPABILITY OF A VEHICLE POWERTRAIN

[76] Inventors: Michael S. Bachman, 23087 Evan Ct. North, New Boston, Mich. 48264; Marc R. Davis, 5201 Heather Dr., #211, Dearborn, Mich. 48126

[21] Appl. No.: 300,249

[22] Filed: Sep. 2, 1994

[51] Int. Cl.⁶ ..................................................... B60Q 1/00
[52] U.S. Cl. .......................... 340/438; 340/439; 340/441; 340/635; 340/636; 364/424.03; 364/424.01; 180/167; 180/65.1
[58] Field of Search ..................................... 340/438, 439, 340/441, 635, 636; 180/167, 65.1; 364/424.01, 424.03

[56] References Cited

U.S. PATENT DOCUMENTS

| | | | |
|---|---|---|---|
| 3,818,292 | 6/1974 | Berman | 318/139 |
| 4,939,502 | 7/1990 | Ito et al. | 340/438 |
| 5,119,011 | 6/1992 | Lambert | 320/43 |
| 5,315,287 | 5/1994 | Sol | 340/455 |
| 5,352,982 | 10/1994 | Nakazawa et al. | 324/427 |
| 5,367,455 | 11/1994 | Kitagawa et al. | 364/424.01 |
| 5,373,219 | 12/1994 | Grabowski et al. | 318/139 |

Primary Examiner—John K. Peng
Assistant Examiner—Daryl Pope
Attorney, Agent, or Firm—Mark S. Sparschu; Roger L. May

[57] ABSTRACT

The accelerator command signal from an accelerator pedal sensor of an electric vehicle is mapped to a generally lower value in view of a reduced state of charge of the traction battery of the vehicle. The mapping requires the driver of the vehicle to depress the accelerator pedal farther to provide an equivalent accelerator command to the controller which controls the traction motor of the vehicle. The driver is thus given intuitive indication that the powertrain of his vehicle has reduced propulsive capability.

17 Claims, 2 Drawing Sheets

METHOD AND APPARATUS FOR INFORMING A DRIVER OF THE PROPULSIVE CAPABILITY OF A VEHICLE POWERTRAIN

BACKGROUND OF THE INVENTION

1. Field of the Invention

The present invention relates generally to driver information systems and more specifically to systems which inform a driver about the propulsive capability of a vehicle powertrain.

2. Description of the Related Art

In an electric vehicle, the powertrain of the vehicle comprises one or more electric motors (called "traction motors"), which provide propulsion for the vehicle. Energy for the traction motors is stored in one or more batteries on board the vehicle known as "traction batteries". In a typical electric vehicle, the traction motors are three-phase AC induction motors. The DC power in the traction batteries is converted to three-phase AC by an inverter, a device containing power electronics.

An inherent feature of traction motors (and electric motors generally) is that they operate in a "constant torque" region at low speeds and a "constant power" region at higher speeds. In the constant torque region, the torque of the traction motor (and therefore the acceleration of an electric vehicle) is predominantly a function of the current which can be supplied by the power electronics. Low-speed torque is therefore largely independent of the state of charge of the traction batteries. The driver of the vehicle can therefore drive at low speeds (in parking lots, on side streets, and the like) without any suspicion that his traction batteries have a low state of charge.

However, a low battery state of charge very much limits the power of an electric vehicle at higher speeds. Operating at higher speeds, in the "constant power" region of the traction motor, requires power (as opposed to simply current) from the battery. Power output capability of a battery is a direct function of its state of charge.

The troublesome result of a traction motor having the "constant torque" and "constant power" regions is that an electric vehicle can feel like it has full propulsive capability while driven at low speeds, when in fact the vehicle's ability to operate at high speeds is severely limited by traction batteries with a low state of charge. Therefore, a driver may enter a high-speed driving situation (such as a freeway) without the ability to attain the high speeds required.

One way to provide information to the driver regarding the reduced propulsive capability of the traction motors is through a meter on the vehicle dashboard which indicates the state of charge of the traction batteries. However, a more intuitive means of informing the driver of the reduced capability of the traction motors can provide the driver with more useful information.

Therefore, alternative means for informing a driver of reduced propulsive capabilities of the traction motors in his vehicle can provide advantages over the prior art.

SUMMARY OF THE INVENTION

The present invention provides a method for informing a driver of the propulsive capability of a vehicle powertrain having a powertrain controller adapted to control the powertrain. The method comprises the step of reading a first signal representing a desired power output from the powertrain. Also, the method includes the step of mapping the first signal into a second signal in view of a reduced power output capability of the powertrain, wherein the second signal has a value less than or equal to the first signal for all values of the first signal and less than the first signal for some values of the first signal. Additionally, the method includes the step of providing the second signal to the powertrain controller. The first signal has a range with a first endpoint having a first magnitude and a second endpoint having a second magnitude, and the second signal has a range with a third endpoint having a third magnitude and a fourth endpoint having a fourth magnitude. The first magnitude and third magnitude are equal, and the second magnitude and fourth magnitude are equal.

The present invention further provides an apparatus for informing a driver of the propulsive capability of a vehicle powertrain having a powertrain controller adapted to control the powertrain. The apparatus comprises means for reading a first signal representing a desired power output from the powertrain. In addition, the apparatus includes means for mapping the first signal into a second signal in view of a reduced power output capability of the powertrain, wherein the second signal has a value less than or equal to the first signal for all values of the first signal and less than the first signal for some values of the first signal. Further, the apparatus comprises the powertrain controller, coupled to the mapping means to receive the second signal. The first signal has a range with a first endpoint having a first magnitude and a second endpoint having a second magnitude, and the second signal has a range with a third endpoint having a third magnitude and a fourth endpoint having a fourth magnitude. The first magnitude and third magnitude are equal, and the second magnitude and fourth magnitude are equal.

In addition, the present invention provides a second apparatus for informing a driver of the propulsive capability of a vehicle powertrain. The apparatus comprises an accelerator command device. The apparatus further comprises an accelerator position sensor mechanically coupled to the accelerator command device and adapted to provide a first signal representing a position of the accelerator command device. Additionally, the apparatus includes input circuitry electrically coupled to the accelerator position sensor. Further, the apparatus comprises a processor electrically coupled to the input circuitry and adapted to map the first signal into a second signal in view of a reduced power output capability of the powertrain, wherein the second signal has a value less than or equal to the first signal for all values of the first signal and less than the first signal for some values of the first signal. In addition, the apparatus includes a powertrain controller adapted to receive the second signal. The first signal has a range with a first endpoint having a first magnitude and a second endpoint having a second magnitude, and the second signal has a range with a third endpoint having a third magnitude and a fourth endpoint having a fourth magnitude. The first magnitude and third magnitude are equal, and the second magnitude and fourth magnitude are equal.

The present invention provides an intuitive indication to the driver of a vehicle regarding the propulsive capability of the vehicle's powertrain. In doing so, the present invention provides advantages over the prior art.

DETAILED DESCRIPTION OF THE PREFERRED EMBODIMENT

Figure 1:
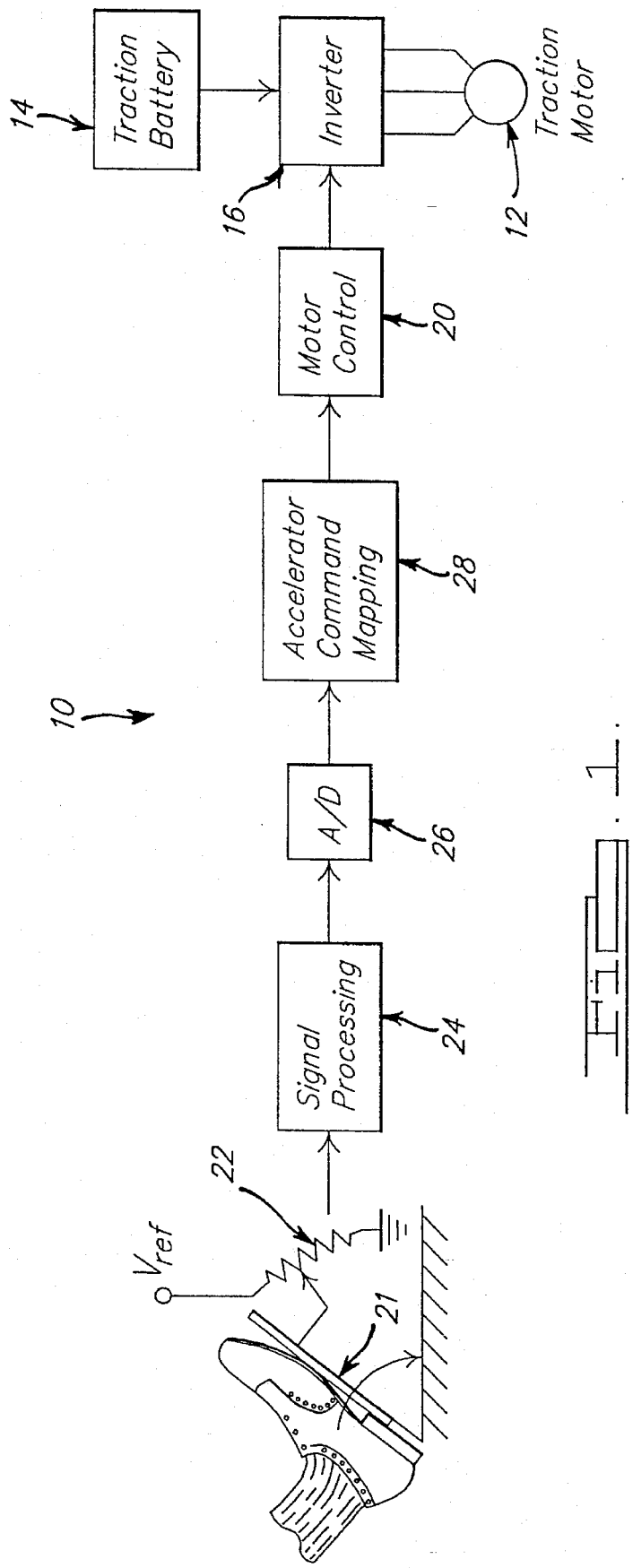
FIG. 1 is a block diagram of a system 10 according to an embodiment of the present invention.

FIG. 1 is a block diagram of a system 10 according to the present invention. Traction motor 12 provides the power to drive an electric vehicle. Power for traction motor 12 comes from traction battery 14. The direct current (DC) power provided by traction battery 14 is converted to three-phase alternating current (AC) power by inverter 16. Inverter 16 is in turn controlled by motor control 20. Motor control 20 is responsible for taking an accelerator pedal command signal from accelerator pedal position sensor 22 and causing traction motor 12 to generate power in response to that command signal.

To this point, the system described is a conventional system well-known in the art of electric vehicles.

Accelerator pedal 21 is pressed by the driver's foot to indicate the driver's desired power output from traction motor 12, which provides power for the vehicle. Preferably, accelerator pedal position sensor 22 is a potentiometer, which provides an analog voltage proportional to the extent to which the driver has depressed accelerator pedal 21. A constant voltage $V_{ref}$ supplies a reference voltage for pedal position sensor 22.

The output of accelerator pedal position sensor 22 is fed to signal processing block 24. Signal processing block 24 represents simple capacitive and/or resistive-capacitive (RC) low-pass filtering to reject high frequency electrical noise. Such filtering is conventional and well-known to those skilled in the art.

The output of signal processing block 24 is converted from an analog signal to a digital signal by analog-to-digital (A/D) converter 26. The output of A/D converter 26 is thus compatible to be operated on by digital logic (for example, a microprocessor).

The output of A/D converter 26 is fed to accelerator command mapping block 28. Preferably, the function performed by accelerator command mapping block 28 is performed by a microprocessor or a digital signal processor (DSP). Accelerator command mapping block 28 maps the accelerator command signal entering the block into a second, modified, accelerator command signal which exits the block.

Figure 2:
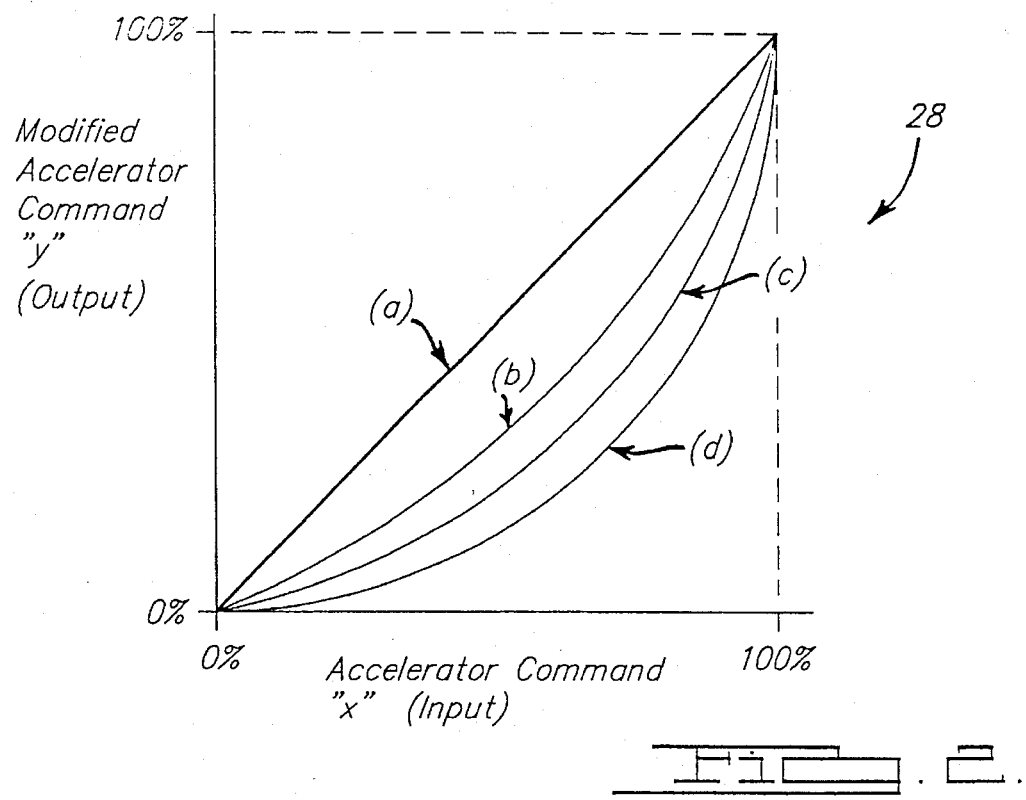
FIG. 2 is a graph showing the mapping performed by accelerator command mapping block 28 of FIG. 1.

Referring now to FIG. 2, the mapping performed by accelerator command mapping block 28 will be described in detail. In the graph of FIG. 2, the accelerator command signal entering accelerator command mapping block 28 is depicted as the independent variable, and the modified accelerator command signal exiting accelerator command mapping block 28 is the dependent variable. If the state of charge of traction battery 14 is high enough to assure maximum power output from traction motor 12 (FIG. 1), Curve (a) is chosen for the mapping. Curve (a) provides a one-to-one correspondence between input and output. If, however, the state of charge of traction battery 14 is such that maximum power output from traction motor 12 is not assured, a different curve (such as Curves (b), (c) or (d)) is chosen. Whenever a curve different than the one-to-one correspondence of Curve (a) is chosen, the curve preferably produces an output signal which for all values of the input signal is less than or equal to the input signal. Preferably, any of the curves applied in accelerator command mapping block 28 (except the one-to-one relationship depicted in curve (a)) is an exponential curve. The transfer function is preferably of the form:

$$y = \frac{1}{e^a - 1} [e^{ax} - 1]. \quad (1)$$

In the above equation, "a" is a constant and can be any number (integer or fraction) greater than zero. Also, "x" is the input accelerator command signal to accelerator command mapping block 28 and "y" is the output modified accelerator command signal from block 28. "x" can have a value from 0 to 1, "0" representing 0% accelerator command by the driver and "1" representing 100% accelerator command (that is, full depression of accelerator pedal 21).

The reader will recognize that the scaling factor $$\frac{1}{e^a - 1}$$

in Equation (1) assures that when "x" is zero, "y" is zero and when "x" is one, "y" is one. As a result, 0% accelerator command maps to 0% output from block 28 and 100% accelerator command maps to 100% output from block 28.

As the battery state of charge decreases, the curve employed in accelerator command mapping block 28 is changed. The change is performed by increasing the value of the constant "a" in Equation (1). The result is a curve that "sags" more (for example, Curve (c) as opposed to Curve (b)), but which always has the same result at 0% accelerator command and at 100% accelerator command.

Referring again to FIG. 1, the output of accelerator command mapping block 28 is provided to motor control block 20. Motor control block 20 represents any motor control functionality known to the art. Motor control block 20 controls traction motor 12 in accordance with the modified accelerator command provided at the output of accelerator command mapping block 28.

The net result of system 10 illustrated in FIG. 1 is as follows. As the state of charge of traction battery 14 decreases, the driver must depress accelerator pedal 21 farther to generate the same level of accelerator command to motor control 20. The driver is thus given continually-updating feedback regarding the capability of his vehicle. However, at all times, 0% accelerator command maps to 0% modified accelerator command and 100% accelerator command maps to 100% modified accelerator command. So, if the driver needs the maximum power capability of his vehicle, he can always receive it by fully depressing accelerator pedal 21.

Figure 3:
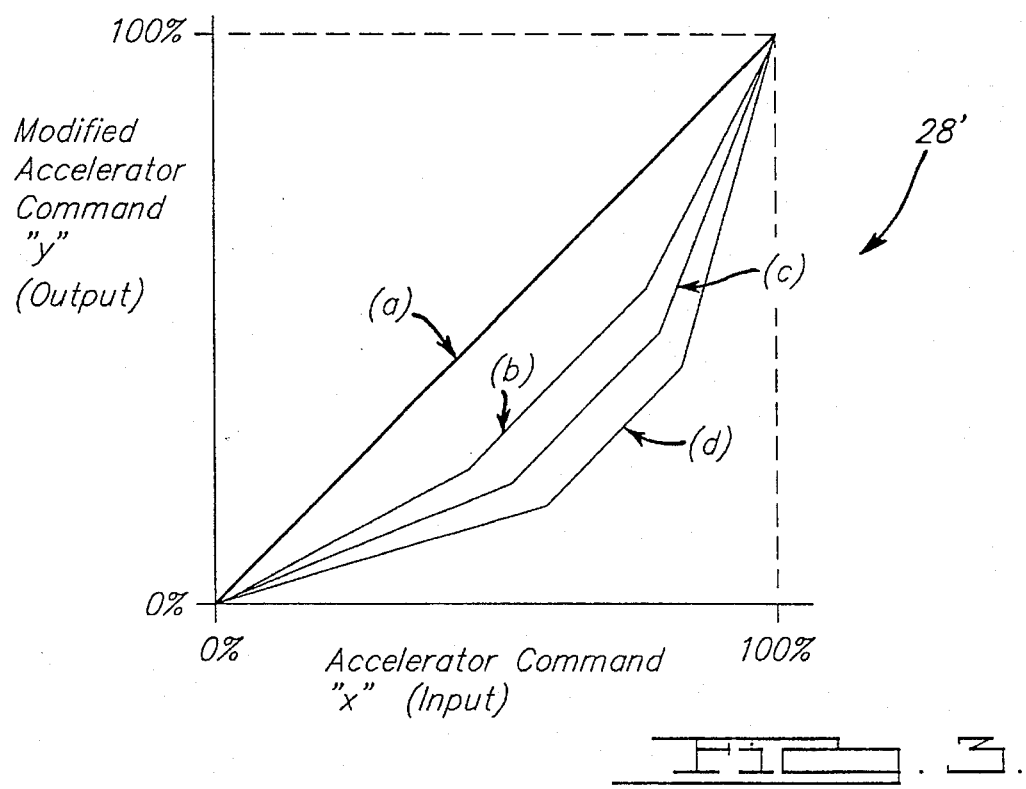
FIG. 3 is a graph showing an alternative mapping performed by an accelerator command mapping block 28'.

One skilled in the art will recognize that computing the exponential functions embodied in accelerator command mapping block 28 can be very computationally intensive for a microprocessor. As a result, a modified version 28' of accelerator command mapping block 28 (the mapping function of which is graphically illustrated in FIG. 3) can be employed. Here, straight-line approximations of the various exponential curves are used. Such straight-line approximations are much less computationally-intensive than calculations of actual exponential functions.

The system illustrated in block diagram form in FIG. 1 can be physically partitioned in numerous ways, a few examples of which will now be detailed. Signal processing block 24, analog-to-digital converter 26, accelerator command mapping block 28 and motor control block 20 can all be contained in one electronic controller. In that controller, accelerator command mapping block 28 and the logic associated with motor control block 20 can be performed by separate microprocessors or, alternatively, by a single microprocessor. As an example of yet another alternative mechanization, signal processing block 24, analog-to-digital converter 26 and accelerator command mapping block 28 can be located in one electronic controller (an "accelerator command module"). The output of accelerator command mapping block 28 would then be provided (via pulse-width modulation, a serial communications protocol or otherwise) to a second electronic controller which performs the motor control functions associated with motor control block 20.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for informing a driver of a propulsive capability of a vehicle powertrain having a powertrain controller coupled to said powertrain to control a power output from said powertrain, said method comprising the steps of:

reading a first signal representing said driver's desired power output from said powertrain;

mapping said first signal into a second signal in view of a reduced propulsive capability of said powertrain, wherein said second signal has a value less than or equal to said first signal for all values of said first signal and less than said first signal for some values of said first signal; and providing said second signal to said powertrain controller;

wherein said powertrain further comprises an electric motor;

wherein said first signal has a range with a first endpoint having a first magnitude and a second endpoint having a second magnitude;

wherein said second signal has a range with a third endpoint having a third magnitude and a fourth endpoint having a fourth magnitude;

wherein said first magnitude and said third magnitude are equal; and wherein said second magnitude and said fourth magnitude are equal.

2. A method for informing a driver of the propulsive capability of said vehicle powertrain as recited in claim 1, wherein said powertrain further comprises at least one traction battery coupled to provide power to said electric motor and wherein said reduced propulsive capability comprises a reduced state of charge of said at least one traction battery.

3. A method for informing a driver of the propulsive capability of said vehicle powertrain as recited in claim 2, wherein said step of mapping said first signal comprises applying an exponential function to said first signal.

4. A method for informing a driver of the propulsive capability of said vehicle powertrain as recited in claim 3, wherein said exponential function comprises:

$$y = \frac{1}{e^a - 1} [e^{ax} - 1],$$

where "x" is said first signal, "y" is said second signal and "a" is a constant greater than zero.

5. A method for informing a driver of the propulsive capability of said vehicle powertrain as recited in claim 4, wherein said method further comprises increasing said constant "a" as said battery state of charge decreases.

6. A method for informing a driver of the propulsive capability of said vehicle powertrain as recited in claim 4, wherein said step of mapping said first signal comprises applying an approximation of an exponential function to said first signal.

7. A method for informing a driver of the propulsive capability of said vehicle powertrain as recited in claim 6, wherein said exponential function comprises:

$$y = \frac{1}{e^a - 1} [e^{ax} - 1],$$

where "x" is said first signal, "y" is said second signal and "a" is a constant greater than zero.

8. A method for informing a driver of the propulsive capability of said vehicle powertrain as recited in claim 7, wherein said method further comprises increasing said constant "a" as said battery state of charge decreases.

9. An apparatus for informing a driver of a propulsive capability of a vehicle powertrain, said apparatus comprising:

means for reading a first signal representing a desired power output from said powertrain;

means for mapping said first signal into a second signal in view of a reduced propulsive capability of said powertrain, wherein said second signal has a value less than or equal to said first signal for all values of said first signal and less than said first signal for some values of said first signal; and a powertrain controller coupled to said mapping means to receive said second signal;

wherein said first signal has a range with a first endpoint having a first magnitude and a second endpoint having a second magnitude;

wherein said second signal has a range with a third endpoint having a third magnitude and a fourth endpoint having a fourth magnitude;

wherein said first magnitude and said third magnitude are equal; and wherein said second magnitude and said fourth magnitude are equal.

10. An apparatus for informing a driver of the propulsive capability of said vehicle powertrain as recited in claim 9, wherein said mapping means comprises means for applying an exponential function to said first signal.

11. An apparatus for informing a driver of the propulsive capability of said vehicle powertrain as recited in claim 10, wherein said exponential function comprises:

$$y = \frac{1}{e^a - 1} [e^{ax} - 1],$$

where "x" is said first signal, "y" is said second signal and "a" is a constant greater than zero.

12. An apparatus for informing a driver of the propulsive capability of said vehicle powertrain as recited in claim 9, wherein said mapping means comprises means for applying a straight-line approximation of an exponential function to said first signal.

13. An apparatus for informing a driver of the propulsive capability of said vehicle powertrain as recited in claim 12, wherein said exponential function comprises:

$$y = \frac{1}{e^a - 1} [e^{ax} - 1],$$

where "x" is said first signal, "y" is said second signal and "a" is a constant greater than zero.

14. An apparatus for informing a driver of a propulsive capability of a vehicle powertrain, said apparatus comprising:

an accelerator command device;

an accelerator position sensor mechanically coupled to said accelerator command device, said sensor providing a first signal representing a position of said accelerator command device;

input circuitry electrically coupled to said accelerator position sensor;

a processor electrically coupled to said input circuitry and programmed to map said first signal into a second signal in view of a reduced propulsive capability of said powertrain, wherein said second signal has a value less than or equal to said first signal for all values of said first signal and less than said first signal for some values of said first signal; and a powertrain controller coupled to said processor to receive said second signal;

wherein said first signal has a range with a first endpoint having a first magnitude and a second endpoint having a second magnitude;

wherein said second signal has a range with a third endpoint having a third magnitude and a fourth endpoint having a fourth magnitude;

wherein said first magnitude and said third magnitude are equal; and wherein said second magnitude and said fourth magnitude are equal.

15. An apparatus for informing a driver of the propulsive capability of said vehicle powertrain as recited in claim 14 wherein said accelerator command device is an accelerator pedal.

16. An apparatus for informing a driver of the propulsive capability of said vehicle powertrain as recited in claim 15 wherein said processor is a microprocessor.

17. An apparatus for informing a driver of the propulsive capability of said vehicle powertrain as recited in claim 15 wherein said processor is a digital signal processor.

* * * * *